United States Patent [19]

Herring

[11] Patent Number: 5,284,384
[45] Date of Patent: Feb. 8, 1994

[54] SPRING BRAKE VALVE

[75] Inventor: C. Roy Herring, La Habre Heights, Calif.

[73] Assignee: Sealco Air Controls, Inc., Phoenix, Ariz.

[21] Appl. No.: 870,478

[22] Filed: Apr. 17, 1992

[51] Int. Cl.⁵ .............................. B60T 13/00
[52] U.S. Cl. .............................. 303/28; 303/7
[58] Field of Search ............ 188/170; 303/7, 8, 28, 303/30, 33, 37, 46, 60, 69, 71, 86, 84.1, 84.2

[56] References Cited

U.S. PATENT DOCUMENTS

| | | | |
|---|---|---|---|
| 3,712,686 | 1/1973 | Kersting | 303/71 |
| 3,862,782 | 1/1975 | Horowitz et al. | 303/30 X |
| 4,058,349 | 11/1977 | Ury | 303/69 |
| 4,593,954 | 6/1986 | Campanini | 303/7 |
| 4,653,811 | 3/1987 | Fauck et al. | 303/28 |
| 4,726,628 | 2/1988 | Vaughn | 303/71 X |
| 5,172,958 | 12/1992 | Soll | 303/71 X |

FOREIGN PATENT DOCUMENTS 1500531  8/1989  U.S.S.R. .................. 303/8

Primary Examiner—Robert J. Oberleitner
Assistant Examiner—Alfred Muratori
Attorney, Agent, or Firm—J. E. Brunton

[57] ABSTRACT

A valve assembly for use in conjunction with spring applied, air release parking brakes of the character found in heavy-duty truck-trailers which, in a single valve housing provides system pressure protection, prevents compounding application of the brakes and performs the parking brake release function in an expedicious and highly reliable manner.

9 Claims, 3 Drawing Sheets

SPRING BRAKE VALVE

BACKGROUND OF THE INVENTION

1. Field of the Invention

The present invention relates generally to pneumatic valves. More particularly, the invention concerns a multi-function, pneumatic valve for use in connection with spring applied air release parking brakes of the character used in heavy-duty truck trailers.

2. Discussion of the Invention

Parking brakes on most heavy-duty truck trailers are typically of the spring applied, air pressure release variety. For purposes of safety such brakes are maintained in a "brake on" configuration until air pressure, sufficient to overcome the locking force of the springs, is applied to the air chambers of the brake unit.

Single purpose, spring brake exhaust valves have for some time been commercially available. For example, such a valve is sold by Sealco Air Controls of Phoenix, Arizona under the model number 78021. Such valves are typically used in conjunction with one or more types of pressure protection valves. One such valve is also sold by Sealco Air Controls under the model number 140280. Another unit typically used in conjunction with the standard spring brake exhaust valve is a unit adapted to prevent compounding the application of the brakes. In the prior art, these three separate valves or units were separately installed into the truck-trailer pneumatic system.

The primary thrust of the present invention is to provide a novel valve assembly for use in conjunction with spring applied air release brakes which takes the features of three separate prior art devices and incorporates them into a single valve. In this way only one unit rather than three separate units need be installed in the truck-trailer pneumatic system. This not only simplifies installation, thereby substantially reducing installation costs, but also increases system reliability by significantly reducing the possibility of leaks.

As will be appreciated from the discussion which follows, the single valve of the present invention uniquely provides the required system pressure protection, prevents compounding application of the brakes and performs the brake release function in an efficient and highly reliable manner.

SUMMARY OF THE INVENTION

It is an object of the present invention to provide a novel valve construction for use in connection with spring actuated, air release, parking brakes of the type used in heavy duty trailers.

More particularly, it is an object of the invention to provide a valve construction of the aforementioned character which not only accomplishes positive, on-command release of the spring actuated parking brakes, but at the same time provides adequate pressure protection to the system.

Another object of the invention is to provide a valve construction of the type described which also prevents compounding the application of the trailer parking brakes.

Another object of the invention is to provide a valve of the character described in the preceding paragraphs which is highly compact, light weight and easy to install.

Still another object of the invention is to provide a spring brake release valve assembly which is highly reliable in operation and requires minimum maintenance.

In summary, these and other objectives of the invention are met by a novel valve construction which includes in a single housing a pressure protection subassembly, a spring brake release subassembly and control means in communication with the truck-trailer parking brake service line for preventing compounding the application of the brakes.

DESCRIPTION OF THE INVENTION

Figure 1:
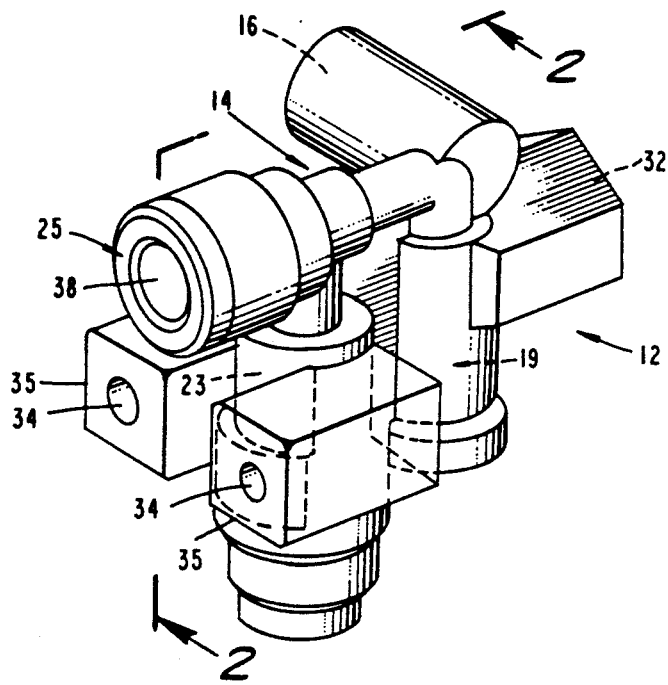
FIG. 1 is a generally perspective view of one form of the spring brake valve of the present invention.
Figure 3:
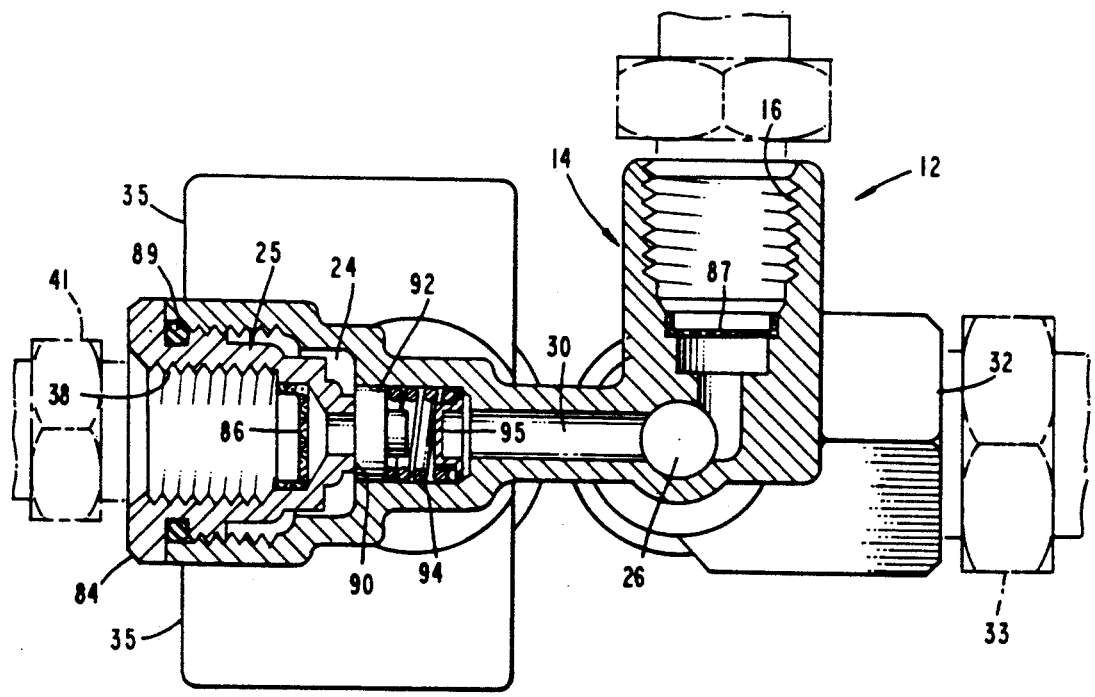
FIG. 3 is a cross-sectional view taken along lines 3—3 of FIG. 2.

Referring to the drawings and particularly to FIGS. 1 and 3, the valve of the present invention for use in a truck-trailer pneumatic system is generally indicated by the numeral 12. The valve is specially adapted for use in a truck-trailer pneumatic system of the character having a source of air under pressure and one or more air pressure reservoirs, air-release parking brake units, and brake service lines.

In the embodiment of the invention shown in the drawings, the valve comprises an integral housing 14 having an inlet 16 adapted to be interconnected with the source of air under pressure provided by the truck-trailer pneumatic system. As best seen by referring to FIGS. 2 and 3, housing 14 includes first, second and third chambers 18, 22 and 24 respectively. Each of these chambers is in communication with the housing inlet 16 via first, second and third air flow paths 26, 28 and 30 respectively. Disposed within chambers 18, 22 and 24 are the three major operating subassemblies of the valve, namely a pressure protection subassembly generally designated by the numeral 19, a pressure holding quick release subassembly 23 and an anti-compounding subassembly 25.

Figure 2:
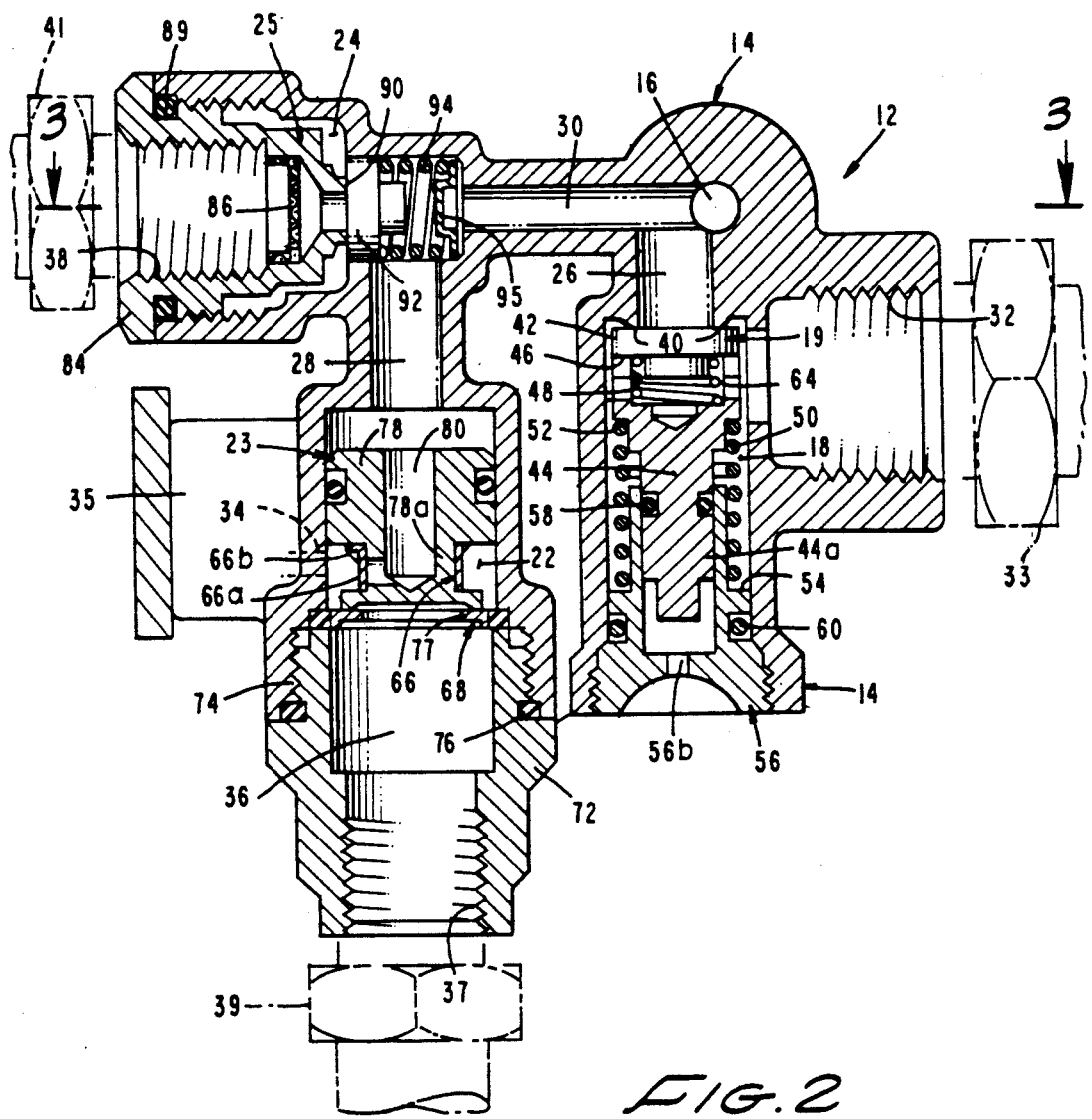
FIG. 2 is a cross-sectional view taken along lines 2—2 of FIG. 1.

As best seen in FIGS. 1 and 2, chamber 18 has an outlet port 32 which is adapted to be interconnected with one of the reservoirs of the truck-trailer pneumatic system via a connector 33. Second chamber 22 has first outlets 34 which are adapted to be placed in communication with the air chambers of the air release brake units of the truck-trailer via connector means 35 and a second outlet 36 which is adapted to communicate with atmosphere via an outlet 37 and connector 39. Third chamber 24 is provided with a flow port 38 which is in communication with the control or brake service line of the truck-trailer pneumatic system by means of a connector 41.

Disposed within first chamber 18 is a first valve means for selectively blocking the flow of air to and from the reservoir (not shown) through the first chamber outlet 32. The first valve means is uniquely designed so as to be responsive to air under a predetermined pressure to permit air flow between first chamber 18 and outlet 32. In the present form of the invention, the first valve means comprises a first chamber valve seat 40 formed at the mouth of chamber 18, a valve member 42 which is movable from a first position in sealing engagement with the valve seat to a second position spaced apart from the valve seat. The first valve means also comprises first and second biasing means both functioning to urge valve member 42 into the first valve closed position. As best seen by referring to FIG. 2, the first biasing means of the first valve means here comprises a valve body 44 which is reciprocally movable within chamber 18 between a first and second position. Valve body 44 is provided with a shoulder 46 for engagement with valve member 42. Valve body 44 is also provided with a counterbore 48, the purpose of which will presently be described.

The first biasing means of the first valve means also comprises a first spring 50 which circumscribes a portion of valve body 44 and is in engagement at its upper end with a shoulder 52 formed on valve body 44. The opposite or lower end of spring 50 is in engagement with a shoulder 54 provided on an externally threaded adjustment member 56 which, in the manner illustrated in FIG. 2, is threadably adjustable within chamber 18. Member 56 includes an upper sleeve portion 56a within which the lower portion 44a of valve body 44 is closely received. An elastomeric O ring 58 is carried by portion 44a of valve body 44 for sealable engagement with the inner surface of sleeve portion 56a of adjustment member 56. Similarly, adjustment member 56 carries proximate its lower end a second elastomeric O ring 60 which sealably engages the inner wall of chamber 18. O ring 58 prevents leakage of air between valve body 44 and the inner wall of sleeve 56a while O ring 60 prevents the leakage of air between adjustment member 56 and the inner wall of chamber 18.

As best seen in FIG. 2, adjustment member 56 is provided with a recessed slot 56b which permits easy rotation by a screw driver or the like of the adjustment member relative to body 14 in a manner so as to precisely adjust the degree of compression of spring 50. More particularly, clockwise movement of adjustment member 56 within chamber 18 will cause spring 50 to exert a progressively greater closing pressure of valve member 42 against seat 40. Obviously, the greater the closing pressure, the greater will be the air pressure on the upper surface of member 42 required to move it away from seat 40. In practice spring 50 can be adjusted so that a minimum pressure of about 60 pounds per square inch exerted against valve member 42 will move the member away from valve seat 40 to a compression wherein approximately 90 pounds per square inch will be required to move valve body 42 away from seat 40. Normal settings for this first valve means are on the order of approximately 80 pounds per square inch. That is, the compression on spring 50 is adjusted so that approximately 70 pounds per square inch of air pressure must be exerted on the upper surface of valve member 42 in order to move it away from valve seat 40.

An important feature of the first valve means resides in the fact that when valve member 42 is moved away from seat 40 the second biasing means, provided here as second coil spring 64, which is seated within counterbore 48, will continue to urge valve member 42 in a direction toward valve seat 40. With this construction, valve member 42 functions as a biased check valve which functions to effectively preclude the flow of air from the reservoir of the pneumatic system in a reverse direction toward inlet 60. With this construction, when 80 psi is reached in passageway 26, the valve will open and allow air under pressure to flow to the supply reservoir on the trailer. This air then becomes available for use in the service portion of the trailer braking system. However, the second biasing means will prevent air within the reservoir from flowing back toward the inlet port 16 in case of any reduction of pressure in the supply line. This allows the first 70 psi of air to be used for spring brake release only.

A second valve means, or brake release subassembly, is disposed within second chamber 22 for controllably permitting air flow toward the air chambers of the air release brakes and for normally blocking air flow toward the second or exhaust outlet 36 of chamber 22. The second valve means also includes a resiliently deformable sleeve type check valve 66 which functions to block reverse air flow in a direction from the air chamber of the air release brakes with which the valve is associated toward the inlet 16 of the valve housing.

In the form of the invention shown in the drawings, the second valve means comprises a resiliently deformable, generally anular shaped sealing member 68 which is disposed proximate outlet 36 of second chamber 22. Sealing member 68 includes a peripheral portion constructed from a suitable elastomeric material such as rubber and a central portion comprising a washer like brass seat 77. Such a sealing member is sold by Seal Co Air Controls under Model No. 509. Sealing member 68 is retained in position across outlet 36 of chamber 36 by means of an externally threaded member 72 which is threadably receivable within internal threads 74 provided proximate outlet 36 of chamber 22 (FIG. 2). An elastomeric O ring 76 is carrried by member 72 to prevent air leakage between member 72 and chamber 22.

The second valve means further includes a valve body 78 which is reciprocally movable within chamber 22. Valve member 78 is provided with an internal flow passageway 80 which is adapted to place flow path 28 in communication with outlets 34 when valve member 66 is moved into an open position permitting the flow of air past the valve member. As best seen in FIG. 2, member 78 is provided with a lower reduced diameter portion 78a which is adapted to closely receive the upper end 66b of sleeve valve 66 in the manner shown in FIG. 2. The skirt portion 66a of sleeve valve 66 is yieldably deformable so that fluid under pressure entering passageway 80 from passageway 28 will distend the skirt portion of valve 66 so as to permit air to flow through second chamber outlets 34 and thence to the air chambers of the air release parking brakes with which the valve is associated.

As indicated in FIG. 2, valve body 78 functions to seal off exhaust port 36 when the pressure within chamber 22 exerts a force thereon sufficient to urge the central portion thereof downwardly into pressural engagement with seat 77 of sealing member 60. When the pressure exerted on member 78 deceases sufficiently, due to a decrease of air pressure within chamber 22, member 78 will lift opening chamber 22 to atmosphere via outlet 36.

Disposed within third chamber 24 is a third valve means which functions to normally block air flow from the service or control line of the pneumatic system inwardly toward passageway 28. Threadably receivable within chamber 24 is a fitting 84 within which filter means is provided. This filter means is here shown as a porous filter 86 which functions to block the passage of particulate contaminates from the brake service line inwardly into the valve. As indicated in FIG. 3, a similar filter 87 is provided in inlet 16 to block passage of particulate contaminates into the valve. An elastomeric O ring 89 is carried by member 84 and functions to prevent leakage of air between members 84 and the valve housing.

In the form of the invention shown in the drawings, the third valve means comprises a valve seat 90 formed on the inboard end of adapter member 84 and a one-way check valve member 92 which is movable from a first position in engagement with valve seat 90 to a second position spaced apart from the valve seat. A biasing means shown here as a coiled spring 94 is carried within the third chamber for continuously urging check valve member 92 into sealing engagement with the valve seat 90 thereby normally preventing the flow of air in the direction from the controllor brake service line of the pneumatic system toward passageways 28 and 30 of the valve housing. One end of spring 94 is in engagement with a shoulder provided on valve member 92 and the other end is in engagement with a spring seat 95. However, upon a sufficient build up of pressure within the brake service line, valve member 92 can move away from seat 90 against the urging of spring 94 thereby permitting the flow of fluid in a direction toward air passageway 28.

Figure 4:
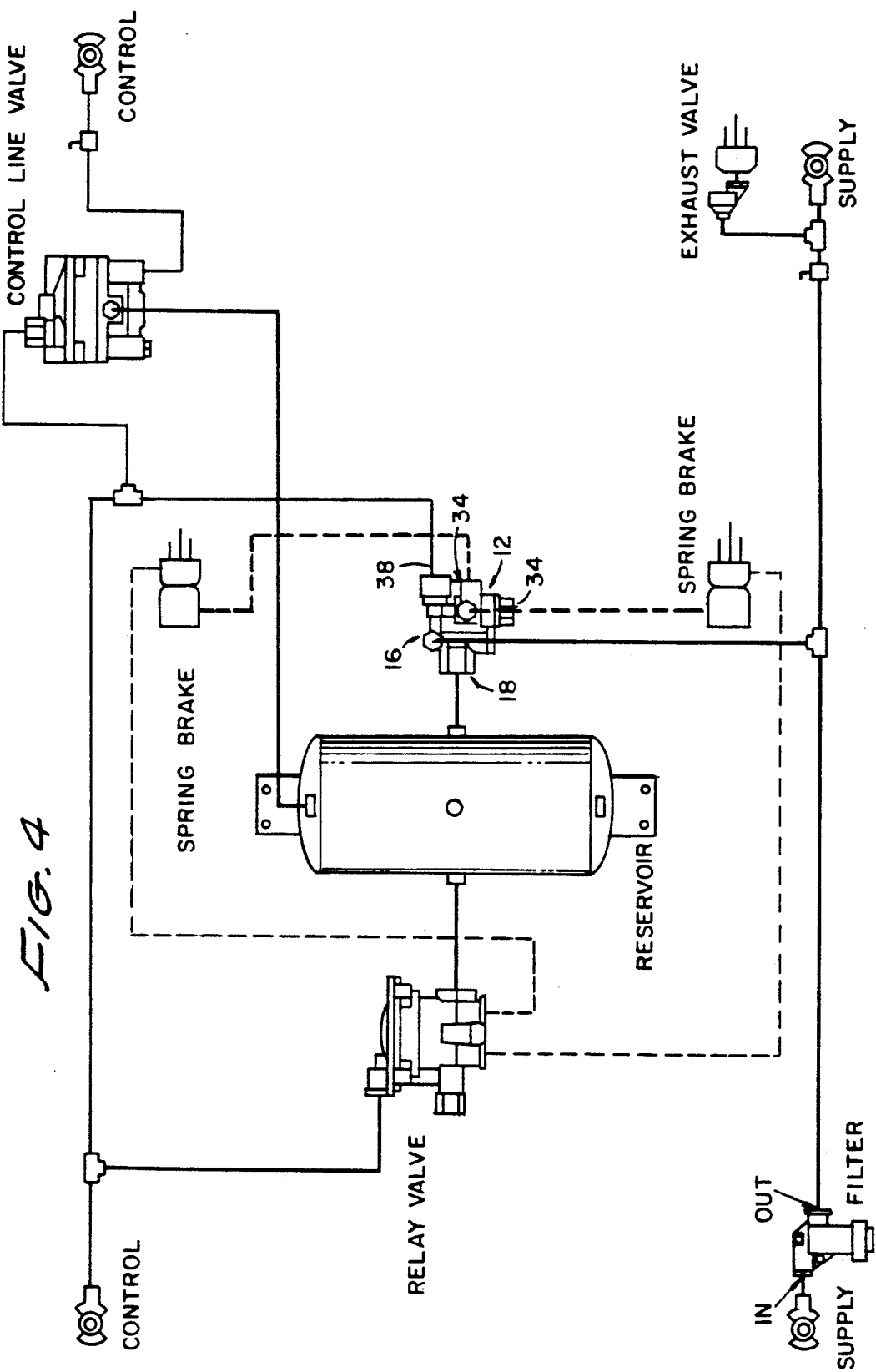
FIG. 4 is a block diagram of the apparatus.

Turning to FIG. 4, the apparatus of the invention is further illustrated in block diagram form. The operation of the apparatus, which will now be described, can readily be understood from a study of FIG. 4.

In operation supply air from the tractor is introduced into the valve of the invention through air inlet 16 and flows first to chamber 22 of the pressure holding quick release subassembly 23 via passageways 28 and 30 (FIG. 2). At the same time, air under pressure also flows to the pressure protection subassembly 19 via passageway 26. As previously mentioned, upon opening of check valve 92 air under pressure from of the tractor can also enter chamber 22 via the control line and flow port 38.

Air under pressure flowing through passageway 28 opens sleeve type check valve 66 causing valve member 78 to move into sealing engagement with seat 77 thereby closing the exhaust port provided in this portion of the valve. Upon closing of the exhaust port closed, the air under pressure flowing past check valve 66 will flow toward the spring brake chambers of the individual parking brake units via outlets 34 (FIG. 1) thereby releasing the spring actuated, air release parking brakes of the trailer. Check valve 66, of course, prevents air within the spring brake air chambers from flowing back toward passageway 28. Member 78 will function to close the exhaust port 36 until such time as the air pressure in the supply area is reduced to approximately forty pounds per square inch. If the supply pressure continues to leak down slowly, this feature will maintain approximately a 2.5 to 1 ratio as the pressure continues to leak to zero. However, if the air pressure is reduced rapidly, member 78 will lift and the unit will function to rapidly exhaust the iar in the spring brake chambers to atmosphere through port 36.

In the event that the inlet air pressure reaches 80 psi, (or whatever pressure the pressure protection valve subassembly is set to), the first valve means will open and permit air to flow past the one-way check valve member 42 and outwardly via port 32 toward a supply tank or reservoir provided on the trailer. This air then becomes available for use in the service portion of the trailer braking system. As previously mentioned, the unique design of the one-way check valve member 42 will not allow the air in the reservoir to flow back toward the supply port in case of any reduction of air pressure in this line. With this construction, the first 80 pounds of air pressure in the supply line will always be used only for spring brake release.

As previously mentioned, under certain pressure balance conditions, air under pressure from the service or control line can also enter air passageway 28 through flow port 38 and flow past one-way check valve member 92 into passageway 28 of the valve. Of course, if the supply line is already pressurized, the check valve design is such that nothing will happen. However, if the supply line has been evacuated in order to actuate the air release parking brakes, then control line air is free to flow past member 92 and enter passageway 26, 28, and 30 and would flow out inlet 16 into the vacated or vented supply line, reducing the amount of pressure in the control line.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A valve for use in a truck-trailer pneumatic system having a source of air under pressure, a reservoir, at least one air release brake unit and a brake service line, said valve comprising a housing having an inlet for interconnection with the source of air under pressure, said housing including first, second and third chambers in communication with said inlet of said housing via first, second and third flow paths respectively, said first chamber having an outlet in communication with the reservoir, said second chamber having a first outlet in communication with said air release brake unit and a second outlet in communication with atmosphere and said third chamber being in communication with the brake service line, said valve further including:

(a) first valve means disposed within said first chamber for blocking a flow of air through said first chamber outlet toward the reservoir, said first valve means being responsive to air under a predetermined pressure to permit air flow between said first flow path and said first chamber outlet;

(b) second valve means disposed within said second chamber for permitting air flow through said first outlet in a direction toward the air release brake and for blocking air flow in an opposite direction, said second valve means further including means for selectively blocking air flow through said second outlet of said second chamber; and (c) third valve means disposed within said third chamber for normally blocking air flow in a direction from said brake service line toward said second valve means, said third valve means being responsive to air under pressure flowing from the brake service line toward said housing to permit air flow toward said second valve means.

2. A valve as defined in claim 1 in which said first valve means comprises:

(a) a valve member movable from a first position blocking air flow through sad first flow path to a second position permitting air flow through said first flow path toward the reservoir; and (b) first biasing means for urging said valve member toward said first position.

3. A valve as defined in claim 2 in which said first biasing means comprises:
   (a) a valve body reciprocally movable within said first chamber between a first and second position, said valve body having a shoulder for engagement with said valve member;
   (b) a first spring for yieldably maintaining sad valve body in said first position.

4. A valve as defined in claim 3 in which said valve body is provided with a counterbore and in which said first valve means further includes second biasing means, said second biasing means comprising a second spring seated within said counterbore for yieldably urging said valve member toward said first position when said valve body is in said second position.

5. A valve for use in a truck-trailer pneumatic system having a source of air under pressure, a reservoir, at least one air release brake unit and a brake service line, said valve comprising a housing having an inlet for interconnection with the source of air under pressure, said housing including first, second and third chambers in communication with said inlet of said housing via first, second and third flow paths respectively, said first chamber having an outlet in communication with the reservoir, said second chamber having a first outlet in communication with said air release brake unit and a second outlet in communication with atmosphere and said third chamber being in communication with the brake service line, said valve further including:
   (a) first valve means disposed within said first chamber for blocking a flow of air through said first chamber outlet toward the reservoir, said first valve means being responsive to air under a predetermined pressure to permit air flow between said first flow path and said first chamber outlet and comprising:
      (i) a first chamber valve seat;
      (ii) a valve member movable from a first position in engagement with said valve seat to a second position spaced apart from said valve seat; and
      (iii) first and second biasing means urging said valve member toward said first position;
   (b) second valve means disposed within said second chamber for permitting air flow toward the air release brake and for normally blocking ar flow through said second outlet of said second chamber, said second valve means including a first check valve for normally blocking air flow in a direction from the air release brake toward said inlet of said housing; and
   (c) third valve means disposed within said third chamber for normally blocking air flow in a direction from said brake service line toward said second valve means, said third valve means being responsive to air under pressure flowing from the brake service line toward said housing to permit air flow toward said second valve means.

6. A valve as defined in claim 5 in which said second valve means comprises:
   (a) a sealing member in sealing engagement with said second outlet of said second chamber to normally block the flow of air therethrough;
   (b) a valve body reciprocally movable within said second chamber from a first position to a second position, said valve body having a fluid flow path therethrough in communication with said second flow path and with said first outlet of said second chamber; and
   (c) check valve means for permitting the flow of air along said fluid flow path in a direction toward said first outlet of said second chamber and for blocking the flow of air in the opposite direction.

7. A valve as defined in claim 5 in which said third valve means comprises:
   (a) a third chamber valve seat;
   (b) a one-way check valve movable from a first position in engagement with said third chamber valve seat to a second position; and
   (c) biasing means for urging said one-way check valve toward sad first position.

8. A valve as defined in claim 5 in which said first biasing means of said first valve means comprises:
   (a) a valve body reciprocally movable within said first chamber between a first and second position, said body having a shoulder for engagement with said valve member;
   (b) a first spring for yieldably maintaining said body in said first position.

9. A valve as defined in claim 8 in which said valve body is provided with a counterbore and in which said second biasing means of said first valve means comprises a second spring seated within said counterbore for yieldably urging said valve member toward said first position when said valve body is in said second position.

* * * * *